United States Patent [19]

Wendle, Jr.

[11] 4,353,810

[45] Oct. 12, 1982

[54] MINIMIZING IRON IN RECOVERED OXIDATION CATALYST MATERIAL IN DMT PROCESS

[75] Inventor: Jesse G. Wendle, Jr., New Hanover County, N.C.

[73] Assignee: Hercofina, Wilmington, N.C.

[21] Appl. No.: 227,002

[22] Filed: Jan. 21, 1981

[51] Int. Cl.³ .................... B01J 31/40; C07C 69/82; C01G 51/00; C01G 49/02
[52] U.S. Cl. .................................. 252/412; 252/420; 423/50; 423/140; 560/77; 560/78
[58] Field of Search ............... 252/412, 413, 414, 420; 560/77, 78; 562/414; 423/50, 140

[56] References Cited

U.S. PATENT DOCUMENTS

| | | | |
|---|---|---|---|
| 3,105,851 | 10/1963 | Knobloch et al. | 260/525 |
| 3,125,595 | 3/1964 | Brady et al. | 252/413 |
| 3,519,684 | 7/1970 | Witt et al. | 260/524 |
| 3,525,762 | 8/1970 | Ichikawa et al. | 260/439 R |
| 3,673,154 | 6/1972 | Trevillyan | 260/439 R |
| 3,873,468 | 3/1975 | Kobinata et al. | 252/413 |
| 3,956,175 | 5/1976 | Shigeyasu et al. | 252/412 |
| 4,096,340 | 6/1978 | Fujii et al. | 560/77 |
| 4,196,076 | 4/1980 | Fujimoto et al. | 210/21 |
| 4,228,091 | 10/1980 | Parteheimer et al. | 423/140 |

FOREIGN PATENT DOCUMENTS 53-28095  3/1978  Japan ................................ 252/413
1413488  11/1975  United Kingdom .

OTHER PUBLICATIONS

Chemical Abstracts 89:31508 (P)—(1978), "Recovery of Liquid Phase Oxidation Catalyst", Shigeyasu et al.
Derwent Abstract of Japanese Publ. Appl. 53/37,592, 2/26/80.
Derwent Abstract of Japanese Publ. Appl. 55/027,037, 4/6/78.

Primary Examiner—P. E. Konopka
Attorney, Agent, or Firm—George H. Hopkins

[57] ABSTRACT

Disclosed is an improvement in a method for the recovery for recycle to the cooxidation-coesterification process for the production of dimethyl terephthalate from p-xylene, air and methanol of oxidation catalyst by aqueous extraction of a distillation residue containing the same. To minimize recycle of any iron present in the residue, iron oxidant material (for example, hydrogen peroxide) is admixed in one embodiment with the residue and water in the aqueous extraction procedure, and in a second embodiment with the resulting aqueous extract. In both embodiments, if any iron is present, it is precipitated. In the first embodiment the precipitate stays with the residue. In the second embodiment the aqueous extract is separated from the precipitate.

7 Claims, 1 Drawing Figure

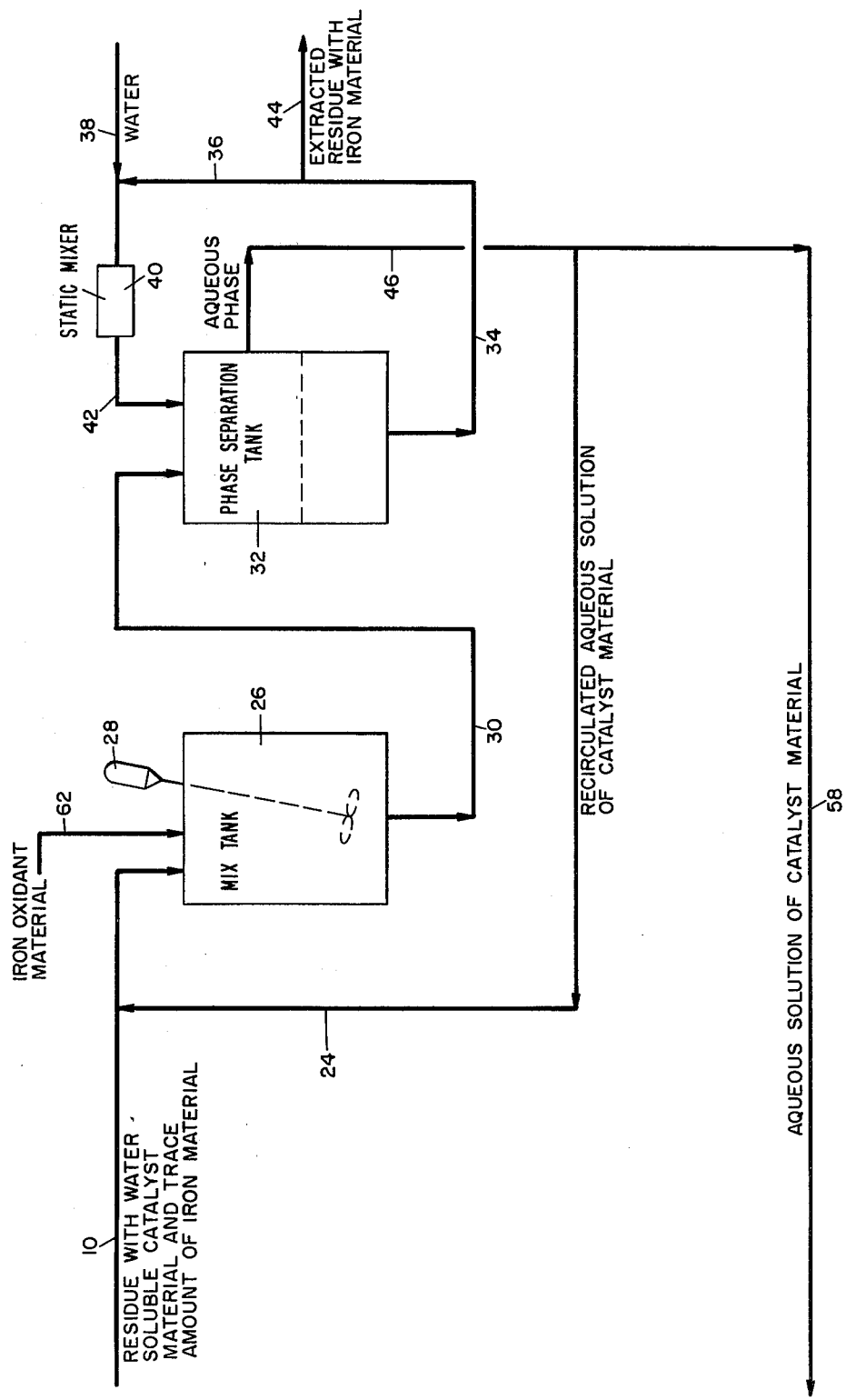

MINIMIZING IRON IN RECOVERED OXIDATION CATALYST MATERIAL IN DMT PROCESS

This invention resides in the chemical arts. More particularly, it relates to that branch of organic chemistry having to do with aromatic carboxylic acid esters and processes for making them. Specifically, it has to do with the catalyst material employed in those processes, and especially the recovery and treatment of such for reuse.

Dimethyl terephthalate (herein "DMT") is a well-known chemical of commercial importance. It is used in enormous quantities in the production of polyester polymers from which fibers, film and the like are made.

A well-known process for making DMT comprises the steps of oxidizing p-xylene in the liquid state with molecular oxygen to form p-toluic acid, esterifying the acid with methanol to form methyl p-toluate, oxidizing methyl p-toluate with molecular oxygen to form monomethyl terephthalate, and esterifying the monomethyl terephthalate with methanol to form DMT. Oxidation of p-xylene and methyl p-toluate with molecular oxygen is generally effected at about 145°–200° C., preferably about 150°–175° C., with a catalytic quantity of oxidation catalyst material which in preferred embodiments also catalyzes the esterification reaction. Esterification of p-toluic acid and of monomethyl terephthalate is generally carried out at about 200°–300° C. and preferably at about 230°–280° C. Although the oxidation catalyst material is usually described as comprising a heavy metal or salt thereof, today the oxidation catalyst material generally comprises cobalt acetate as the sole or major component. The material can and frequently does include as a minor component manganese acetate. These salts are soluble in the oxidation and esterification reaction mixtures. They also are water-soluble. Concentration of the oxidation catalyst material is generally about 0.001–0.1% by weight of the total oxidation reaction mixture.

In the preferred practice of the process the oxidation steps are carried out together in an oxidation stage comprising one or more reactors, and the esterification steps are carried out together in an esterification stage comprising one or more reactors. This is referred to herein as the cooxidation-coesterification process. Patents disclosing embodiments of the cooxidation-coesterification process are the U.S. Pat. No. 2,772,305, to Levine et al., and the U.S. Pat. No. 2,894,978, to Katzchmann. See also "Hydrocarbon Processing", November 1975, p. 131.

In the commercial practice of the cooxidation-coesterification process, which is done on a continuous basis, p-xylene, methyl p-toluate, air (as the source of molecular oxygen), and oxidation catalyst material are introduced into the oxidation stage, reaction mixture formed in the oxidation stage, herein referred to as oxidate, is withdrawn therefrom and either with or without stripping of any unreacted p-xylene therefrom is introduced along with methanol into the esterification stage. Reaction mixture formed in the esterification stage is removed therefrom and distilled to give a methyl p-toluate fraction and a bottoms fraction. The methyl p-toluate fraction is conducted to the oxidation stage and is the source of the methyl p-toluate cooxidized with the p-xylene. The bottoms fraction is distilled to give a DMT fraction and a residue fraction.

The DMT fraction is treated to obtain DMT of the desired degree of purity. The residue fraction, herein called DMT esterified oxidate residue, is purged in whole or in part from the process. In those DMT plants in which only part of the residue fraction is purged, the remainder is recycled to the oxidation stage.

DMT esterified oxidate residue comprises a tar-like organic or tarry fraction and an oxidation catalyst material fraction. The concentration of the oxidation catalyst material fraction generally is about 300–5,000 p.p.m. (parts by weight per million parts of residue). However, lower and higher concentrations are possible and within the scope of this invention. Until a few years ago the purged DMT esterified oxidate residue usually was disposed of by burning. However, because of the ever-spiralling price of crude oil from which is derived most of the p-xylene used in the production of DMT, and the increasing cost of oxidation catalyst material, especially cobalt acetate, the art recently has been devoting its attention to recovering p-xylene values from the tarry fraction, finding higher value uses for the remainder of the tarry fraction, and recovering for reuse the oxidation catalyst material.

One way to recover from the purged DMT esterified oxidate residue oxidation catalyst material for reuse is to extract the residue with water. This results in an aqueous extract comprising catalyst material. In a commercial DMT plant, however, because of the inevitable slight corrosion of reactors, piping, tanks, and the like, the residue also contains minute or trace quantities of iron-bearing substance that is soluble to a significant extent in water. Consequently, the aqueous extract also comprises trace quantities of the iron-bearing substance which, if not removed, accompanies the recovered catalyst material on its return to the DMT process. Over a period of time this results in a build-up of iron (hereinafter used in its broadest sense to include both metal and compound) in the DMT process to a concentration high enough to depress significantly the yield of DMT from p-xylene.

Prior art patents disclose the removal of iron from various process streams, particularly those of cobalt catalyst solutions recovered from processes for oxidation of dialkyl benzenes. These patents mention the importance of removal of iron and other impurities from the recovered catalyst material with respect to maintaining the activity of the recovered catalyst material, which, in turn, translates into effect on the yield of desirable products from the oxidation process. Kobinata et al. in U.S. Pat. No. 3,873,468 teach that undesirable iron and tars can be removed by "regulating the pH of the aqueous phase to a value more than 5 but not exceeding 8 to thereby separate the tar-like product as an oily float and iron" as a precipitate and removing both from the aqueous phase. Trevillyan in U.S. Pat. No. 3,673,154 teaches a process for removal of iron by diluting an acetic acid solution of recovered cobalt catalyst with water to "yield a pH of the solution above 3.0 and to precipitate iron and chromium values." Fugimoto et al. in U.S. Pat. No. 4,196,076 (pertaining to a method for separation of cobalt from nickel in an aqueous solution containing cobalt and nickel salts) states that iron "may be eliminated from the aqueous solution by an established technique such as precipitation by pH adjustment, etc."

In the case of cobalt solutions recovered by aqueous extraction from DMT esterified oxidate residue, the pH's are, without adjustment, usually in the range of about 3 to 4. Filtration of these recovered solutions does not significantly reduce their iron contents. However, if the pH of these solutions is raised to about 6 or over, iron is precipitated, but so also is cobalt. Hence, significant amounts of valuable cobalt are lost if the solutions are filtered to remove any precipitated iron.

Hence, a problem to which this invention provides a solution is how to minimize without pH adjustment of the aqueous extract the amount of iron accompanying recycled oxidation catalyst material recovered from DMT esterified oxidate residue.

This invention, in summary, comprises a process in which iron oxidant material is admixed with the aqueous solution of recovered catalyst material in quantity sufficient to precipitate a substantial portion of the iron content thereof, and separating precipitated iron from said solution.

Iron oxidant material is material composed of one or more water-soluble compounds capable under the conditions of this invention of oxidizing the iron content of the iron-bearing residue to a form that is water-insoluble. Preferred examples of iron oxidant material include hydrogen peroxide, hydrogen peroxide-generating compounds, and ozone. A hydrogen peroxide-generating compound is one which in an aqueous medium under the pH conditions of the aqueous solution generates hydrogen peroxide. Examples of such a compound include sodium percarbonate, sodium perborate, carbomide peroxide, and the like. Especially preferred is hydrogen peroxide because it does not appear to have any deleterious effect on the recovery of oxidation catalyst material, and in the DMT process. In this regard, it decomposes to water and oxygen, and in its reaction with iron under the conditions of this invention the only water-soluble compound formed is water itself.

The quantity of iron oxidant material employed can vary over a wide range. However, satisfactory results are achieved when the mole ratio of iron oxidant material to iron present is in the range from about 6:1 to about 10:1.

In one embodiment of the process of this invention the iron oxidant material is mixed with the aqueous solution as it is formed in admixing water and residue in the extraction procedure, and before the solution of catalyst material, and extracted residue are separated. When the solution and residue are separated any precipitated iron remains with the residue.

In a less preferred embodiment the iron oxidant material is admixed with the aqueous solution after said aqueous solution has been separated from the extracted residue. This embodiment is less preferred because it requires an additional mixing step, and an additional separation step.

The resulting iron depleted aqueous solution of oxidation catalyst material either with or without further chemical or physical treatment ultimately is recycled to the oxidation step of the DMT production process.

Admixture of the oxidizing agent material with the aqueous extract of catalyst material is done by conventional ways and means and over broad temperature and pressure ranges. Generally, however, the temperatures and pressures are those prevailing in the extraction process in the case of the preferred embodiment, and at the prevailing temperatures and pressures of the resulting aqueous solution obtained in the second embodiment from the aqueous extraction procedure.

Although the water used in the extraction process can be pure water or generally "tap" water, in many instances it is process water, that is, water formed in, and recovered from the off-gases of, the DMT process, for example, water formed in the oxidation stage and the esterification stage of the process. Such water is acidic, having a pH of about 3–4. This is the result of low alkanoic acids such as formic acid and acetic acid being formed in the oxidation stage and leaving with the off-gases of that stage. Under the concepts of this invention, no pH adjustment of the water is needed in such instances.

The best mode now contemplated of carrying out the invention is illustrated in the drawing which is a material part of these disclosures.

The drawing illustrates in diagrammatic fashion a typical flow sheet of a preferred embodiment of an aqueous extraction method for the recovery of oxidation catalyst material from DMT esterified oxidate residue, which has been modified according to this invention.

As depicted in the drawing, in the extraction method DMT esterified oxidate residue containing water-soluble catalyst material and a trace amount of iron material, typically having a temperature of about 180° C., and with its viscosity, (adjusted, if necessary, by the addition, for example, of methyl para toluate), less than 50 cps. (measured at 100° C. with a Brookfield viscometer, spindle #2) is introduced by way of a feed conduit 10 into a mix tank 26. Also introduced into the mix tank 26 as by way of a recirculation conduit 24 joined to the feed conduit 10 is a stream of recirculated aqueous solution of catalyst material, its flow rate being such that the weight ratio of aqueous solution to residue is above about 1:1. In the mix tank 26 the residue and aqueous solution are admixed as by means of a mixer 28 to finely disperse the residue into the aqueous solution. The size of the mix tank is selected so that at normal operative flow rates the residence time of the resulting dispersion in the mix tank 26 is at least 20 minutes.

Dispersion is withdrawn from the mix tank 26 and conducted by way of conduit 30 into a phase separation tank 32. In this tank the dispersed residue phase is permitted to coalesce and separate from the aqueous phase, the residue phase forming the bottom layer and the aqueous phase forming the top layer.

Extracted residue phase is withdrawn from the phase separation tank 32 as by a withdrawal conduit 34 joined to a recycle conduit 36. At least half by weight of the withdrawn extracted residue phase is conducted through the recycle conduit 36 to a static mixer 40. Water is also introduced into the static mixer 40 as by way of water conduit 38 joined to the recycle conduit 36. The water and extracted residue in the static mixer 40 are subjected to gentle mixing action, that is, mixing action sufficient to admix the water and extracted residue, and replace with the water the residual droplets of aqueous solution of catalyst material in this extracted residue, but insufficient to create a stable emulsion. The resulting mixture is conducted by way of a return conduit 42 to the phase separation tank 32, wherein phase separation of this mixture also takes place.

The remainder of the extracted residue phase withdrawn from the phase separation tank 32 by way of conduit 34 is removed from the system by way of extracted residue discharge conduit 44. Because of the recirculation of the other portion of the extracted residue phase and mixing of the same with water, the extracted residue removed from the system through the discharge conduit 44 has a very low concentration, if at all, of catalyst material.

Aqueous phase, an aqueous solution of catalyst material, which might comprise a small amount of entrained residue, is withdrawn from the phase separation tank 32 by way of withdrawal conduit 46. This conduit is joined to recirculation conduit 24 and recovered catalyst discharge conduit 58. Accordingly, part of the aqueous solution is recycled through recirculation conduit 24 and feed conduit 10 into the mix tank 26. The other part is discharged from the system for return, either with or without further treatment (physical or chemical), to the oxidation stage of the DMT process. An example of such further treatment is a p-xylene wash step (admixture with p-xylene followed by phase separation) to remove the small amount of entrained residue with the p-xylene wash being sent also to the DMT process for use. This particular treatment is an optional step which may be desirable in the event the aqueous solution of recovered catalyst material is to be held in a storage tank before being sent to the oxidation stage of the DMT process.

Up to this point the description of the drawing has been of a preferred aqueous extraction method without modification according to this invention. Without such modification iron material is extracted from the residue along with the catalyst material and is recirculated to the DMT process. Consequently, concentration of iron in the system gradually increases to levels at which oxidation of p-xylene in the DMT process is adversely affected and product yield is significantly diminished.

To avoid this problem, and in accordance with this invention, iron oxidant material is introduced through an auxiliary feed conduit 62 into the mix tank 26. The flow rate of the iron oxidant material is selected to provide a mole ratio of iron oxidant material to iron present in the residue in the range from about 6:1 to about 20:1. Under these conditions the iron oxidant material is finely dispersed with the water and residue in the mix tank 26. Substantially all, if not all, iron present is oxidized to water-insoluble form. Hence, when the dispersion is removed from the mix tank 26 and introduced by conduit 30 into the phase separation tank 32, the resulting insoluble iron material stays with the extracted residue phase and is removed therewith by way of withdrawal conduit 34 and extracted residue discharge conduit 44. The aqueous phase withdrawn from the phase separation tank 36 by way of conduit 46 is substantially iron free.

Typical flow rates, catalyst concentration and temperature conditions in the embodiment of the drawing are set forth in the following table. In this embodiment the iron oxidant material consists essentially of hydrogen peroxide and it is introduced through the auxiliary feed conduit 62 into the mix tank 26 in an aqueous solution at a concentration of 35% by weight. In presenting the flow rates it is assumed that the weight of the iron material stays constant and that by the time the dispersion reaches the phase separation tank 32 all of the hydrogen peroxide has decomposed to water of equal weight.

TABLE

|  | 10 | 24 | 62 | 30 | 34 | 36 | 38 | 44 | 46 | 58 |
|---|---|---|---|---|---|---|---|---|---|---|
| Residue, pph | 10,000 | 146 | — | 10,146 | 29,621 | 19,650 | — | 9,971 | 175 | 29 |
| Water, pph | — | 20,000 | 4.9 | 20,007 | 606 | 404 | 4,111 | 202 | 23,916 | 3,916 |
| Hydrogen Peroxide, pph | — | — | 2.6 | — | — | — | — | — | — | — |
| Catalyst Concentration, ppm | 1,200 | 3,000 | — | 2,400 | 0–30 | 0–30 | — | 0–30 | 2,980 | 3,000 |
| Iron Concentration, ppm | 30 | 24 | — |  | 22 | 22 | 5 | 22 | 24 | 24 |
| Temperature, °C. | 180 | 95 | Ambient | 95–100 | 95 | 95 | 95 | 95 | 95 | 95 |

It will be observed that a typical iron concentration of the residue entering the system is 30 p.p.m. while a typical iron concentration of the aqueous solution of recovered catalyst discharged from the system for return to the DMT process is 24 p.p.m. Consequently, this invention provides an effective method for the reduction of iron in the recovery of oxidation catalyst material, and thus preventing build-up of iron concentration in the circulation of oxidation catalyst material in the cooxidation-coesterification process for making DMT.

Various features, advantages and other specific embodiments of this invention will become readily apparent to those exercising ordinary skill in the art after reading the foregoing disclosures. These specific embodiments are within the scope of the claimed subject unless otherwise expressly indicated to the contrary. Moreover, while a specific embodiment of this invention has been described in considerable detail, variations and modifications of this embodiment can be effected without departing from the spirit and scope of the invention as disclosed.

What is claimed is:

1. In the cooxidation-coesterification process for the production of dimethyl terephthalate, in which an esterified oxidate residue containing water-soluble, heavy metal, oxidation catalyst material is obtained and catalyst material is recovered in an aqueous solution at a pH in the range of about 3 to 4 by aqueous extraction of said residue, and said aqueous solution of recovered catalyst material is recycled, the improvement in which iron oxidant material selected from the group consisting of hydrogen peroxide, hydrogen peroxide generating compounds, and ozone is admixed with said aqueous solution in quantity sufficient to cause a substantial portion of any iron content of said solution to precipitate, and separating precipitated iron from said solution.

2. The process according to claim 1 in which said iron oxidant material is admixed with said aqueous solution after said aqueous solution has been separated from said residue, and any precipitated iron that results is separated from the resulting iron depleted aqueous solution.

3. A process according to claim 1 in which said iron oxidant material is admixed with said aqueous solution as it is being formed in the aqueous extraction of said residue, and any precipitated iron that results is separated from said solution with the extracted residue when said solution and extracted residue are separated.

4. A process according to claim 3 in which said iron oxidant material consists essentially of hydrogen peroxide.

5. A process according to claim 4 in which the mole ratio of iron oxidant material to iron present in said residue is in the range from about 6:1 to 10:1.

6. In a process for the recovery of oxidation catalyst material from DMT esterified oxidate residue by the aqueous extraction of said residue to obtain an aqueous solution of said oxidation catalyst material at a pH in the range of about 3 to 4, the improvement for minimizing the iron content of said solution, which comprises admixing with said solution iron oxidant material selected from the group consisting of hydrogen peroxide, hydrogen peroxide generating compounds and ozone, and separating any precipitated iron therefrom.

7. A process according to claim 6 in which said iron oxidant material is admixed with the aqueous solution as it is being formed in the aqueous extraction of said residue.

* * * * *